Figure 6:
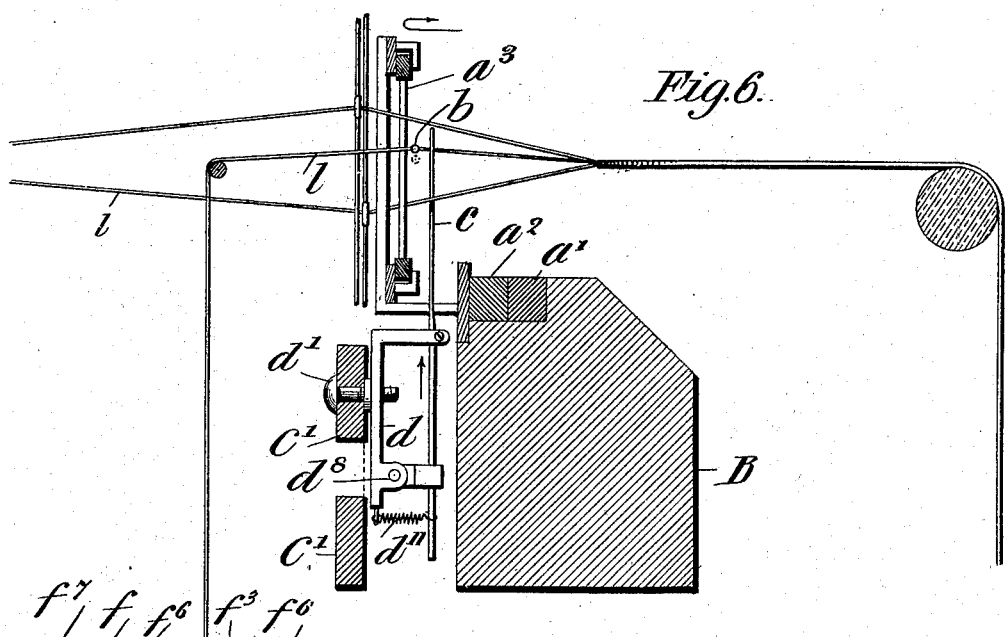

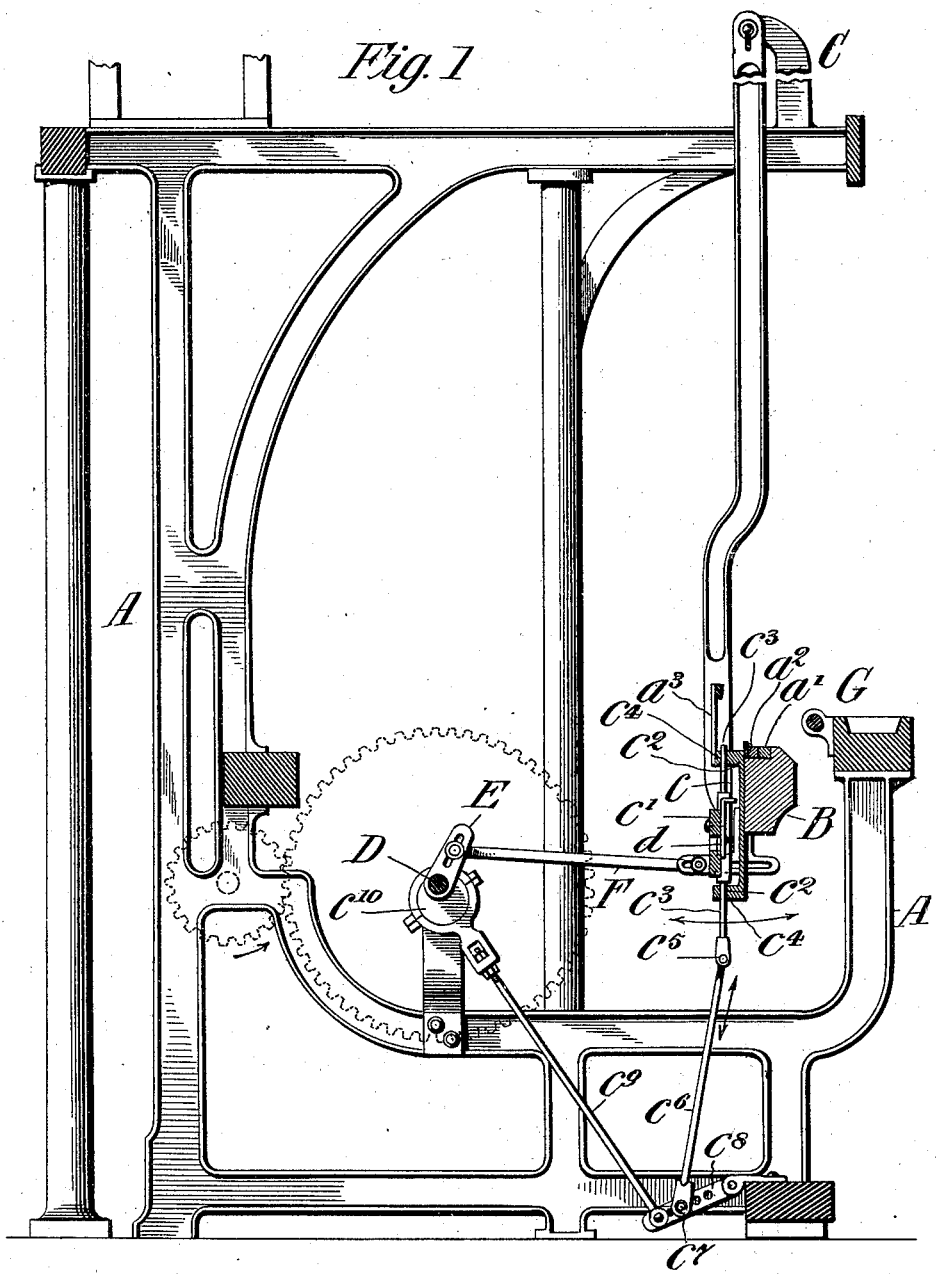

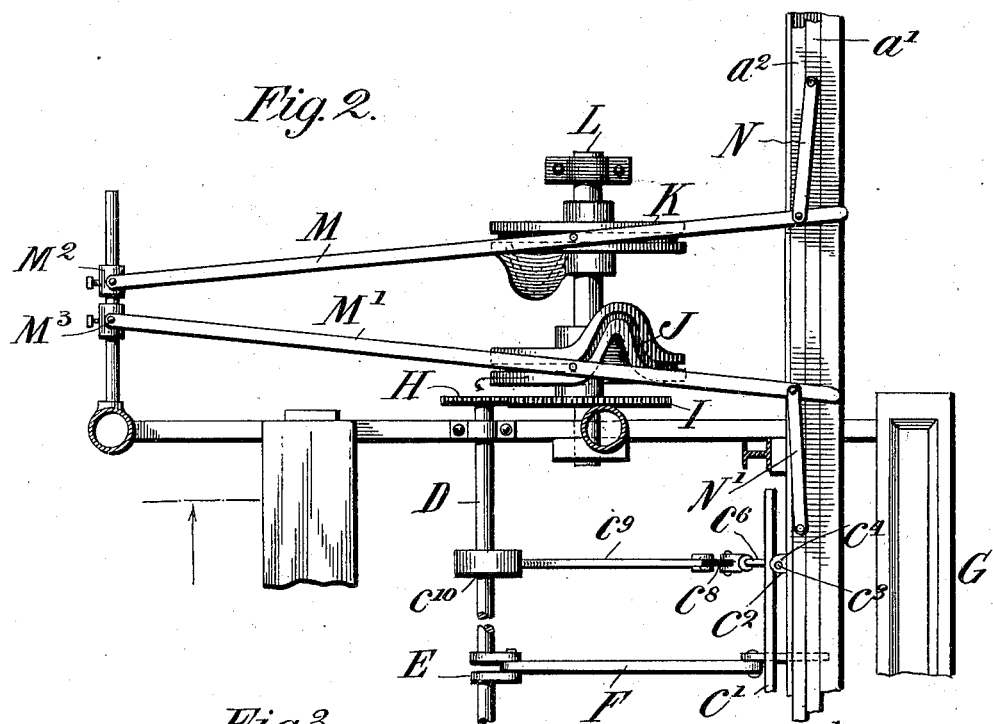
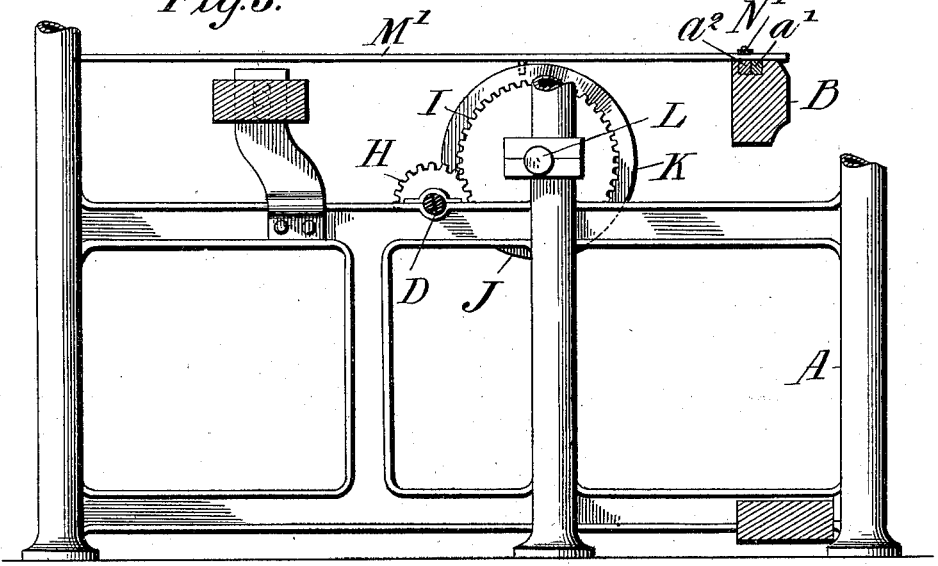

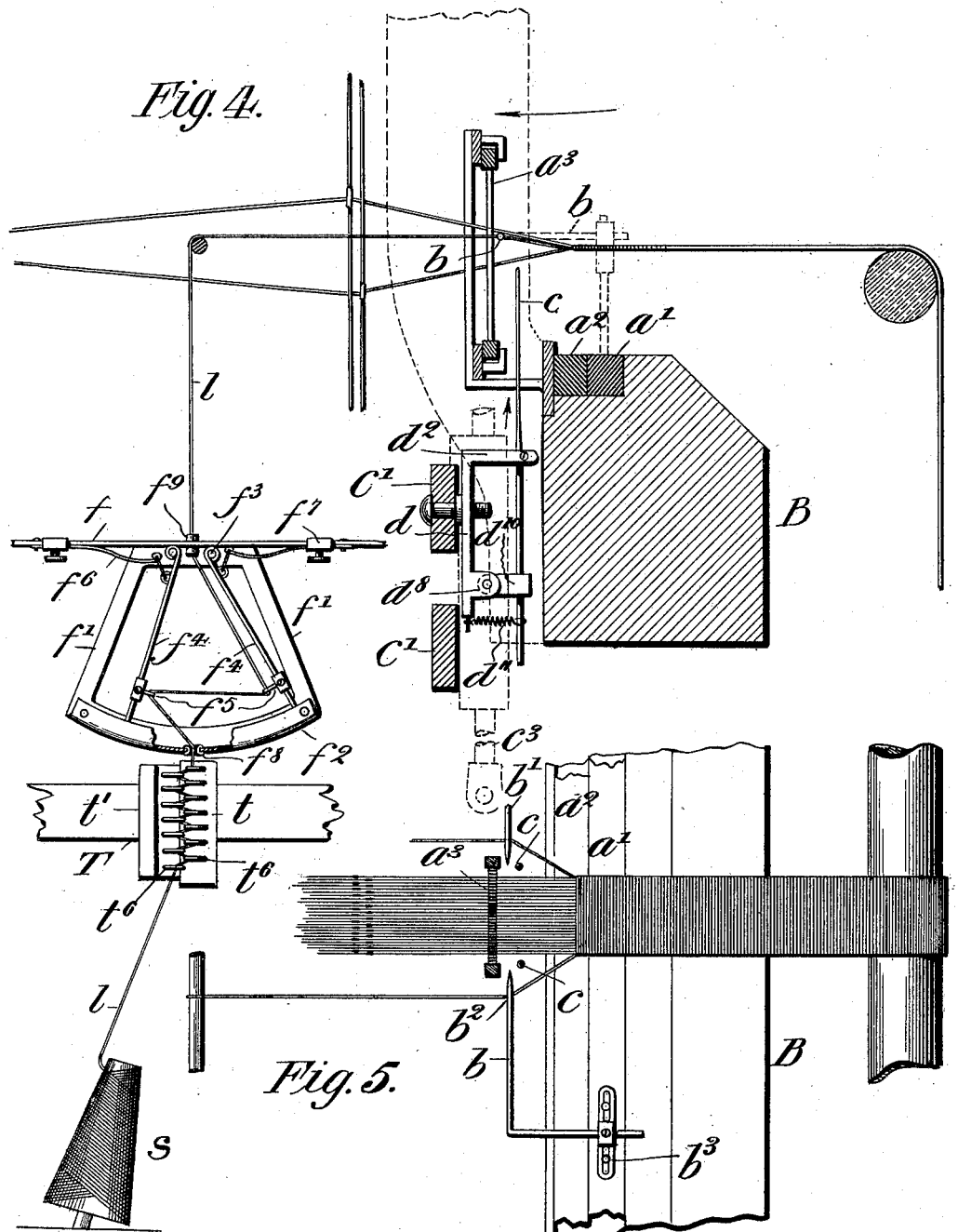

No. 653,249. Patented July 10, 1900.
G. F. KUETT.
LOOM.
(Application filed Dec. 13, 1899.)
(No Model.) 8 Sheets—Sheet 4.

Witnesses:
L. C. Hills
W<sup>m</sup> F. Doyle

Inventor:
George F. Kuett,
By Marcellus Bailey
Atty.

THE NORRIS PETERS CO., PHOTO-LITHO., WASHINGTON, D. C.

No. 653,249. Patented July 10, 1900.
G. F. KUETT.
LOOM.
(Application filed Dec. 13, 1899.)
(No Model.) 8 Sheets—Sheet 5.
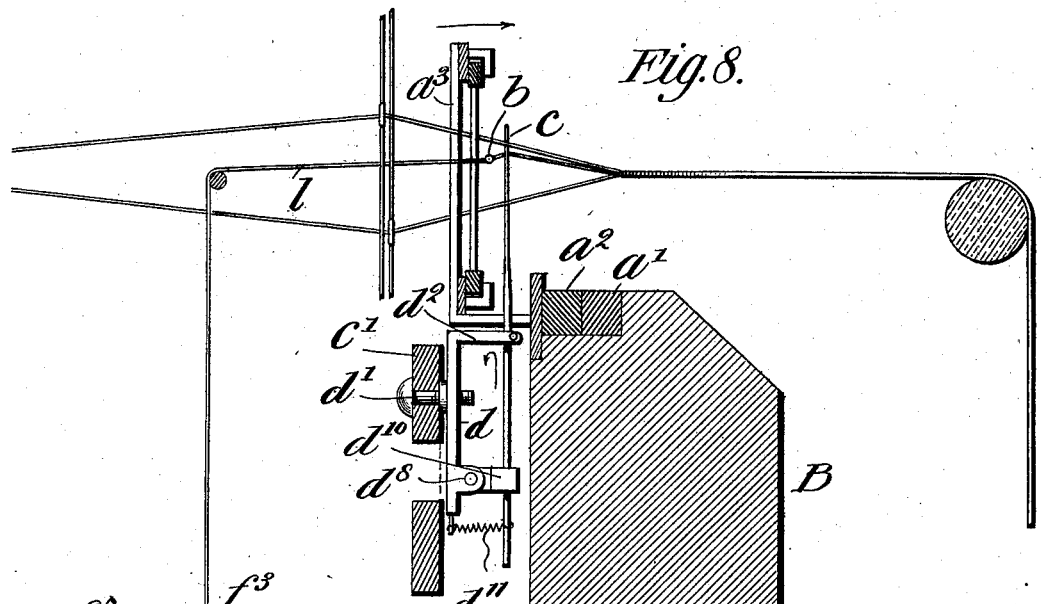
Fig. 8.
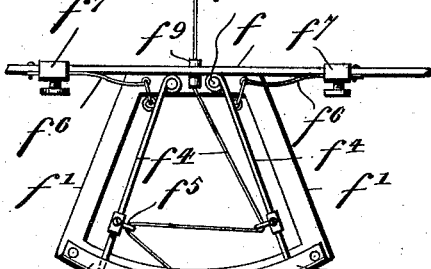
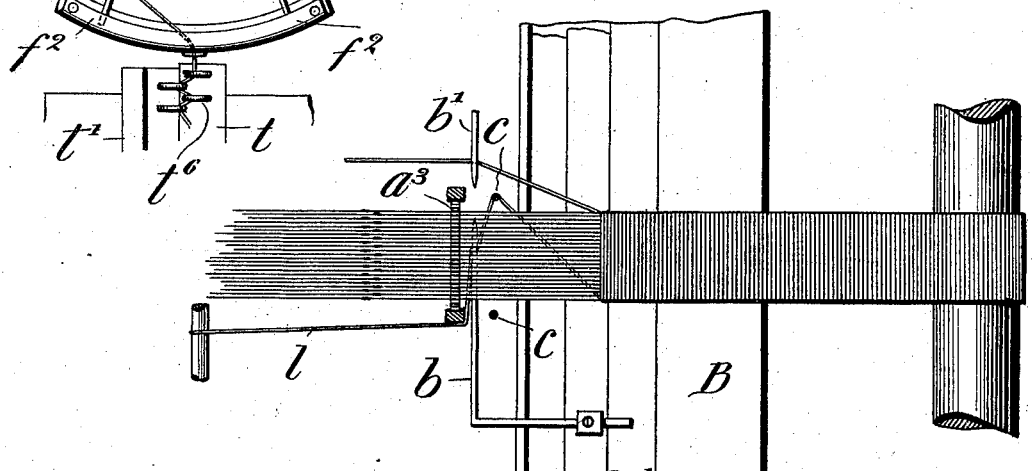
Fig. 9.
Witnesses:
L. C. Hills.
Wm. F. Doyle.
Inventor:
George F. Kuett,
By Marcellus Bailey
Atty.

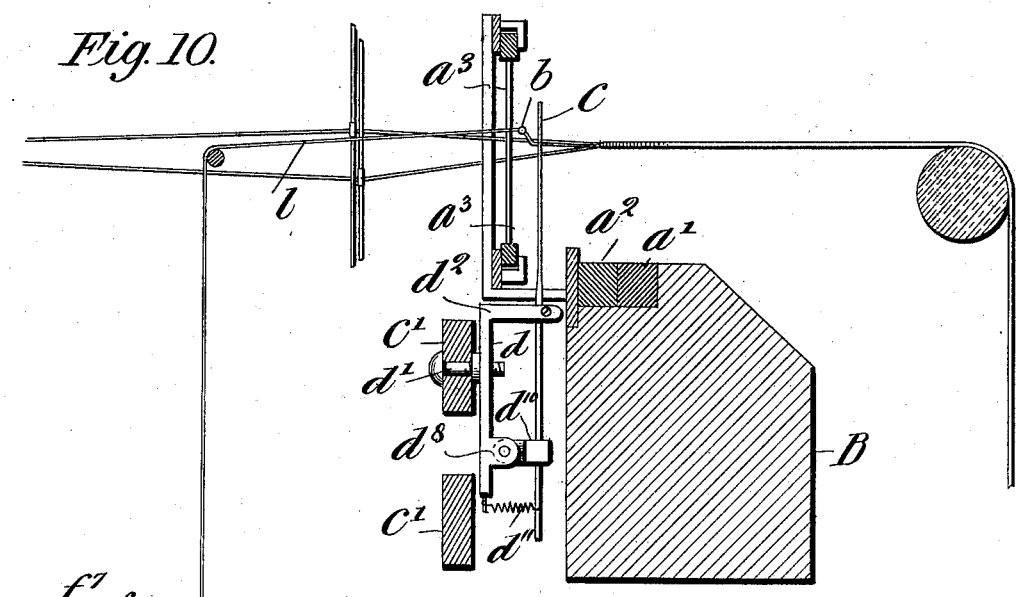
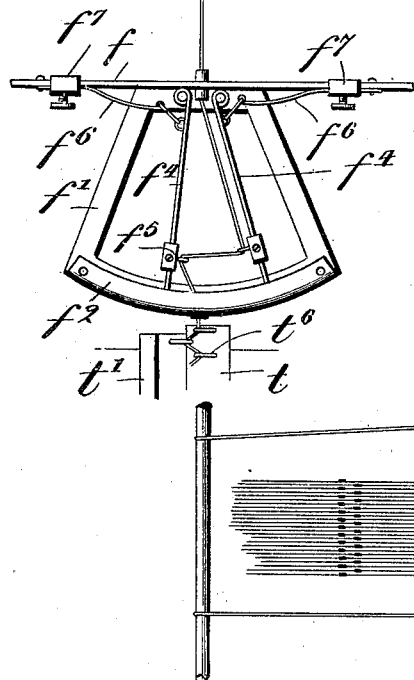
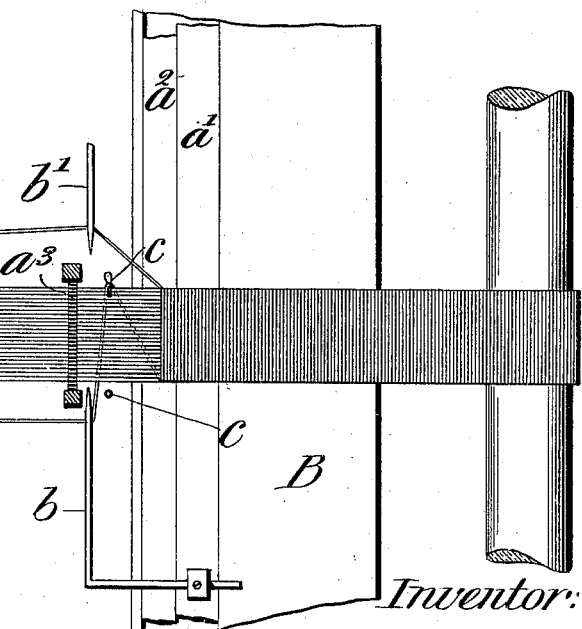

No. 653,249. Patented July 10, 1900.
G. F. KUETT.
LOOM.
(Application filed Dec. 13, 1899.)
(No Model.) 8 Sheets—Sheet 7.
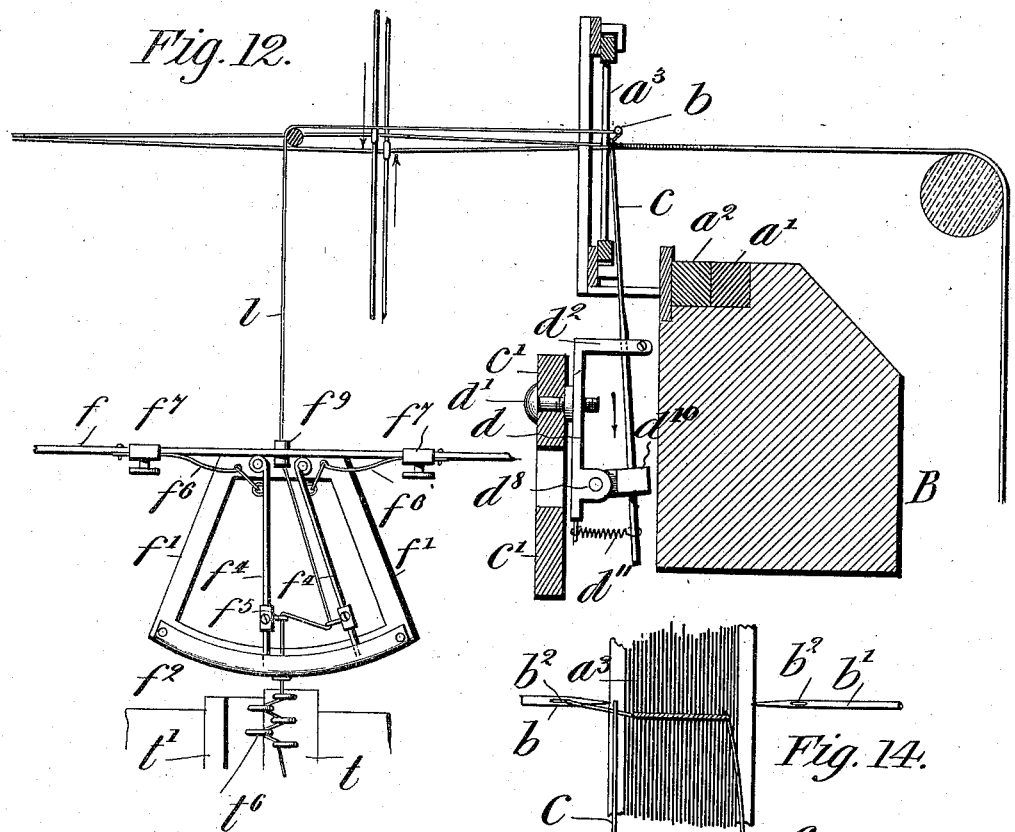
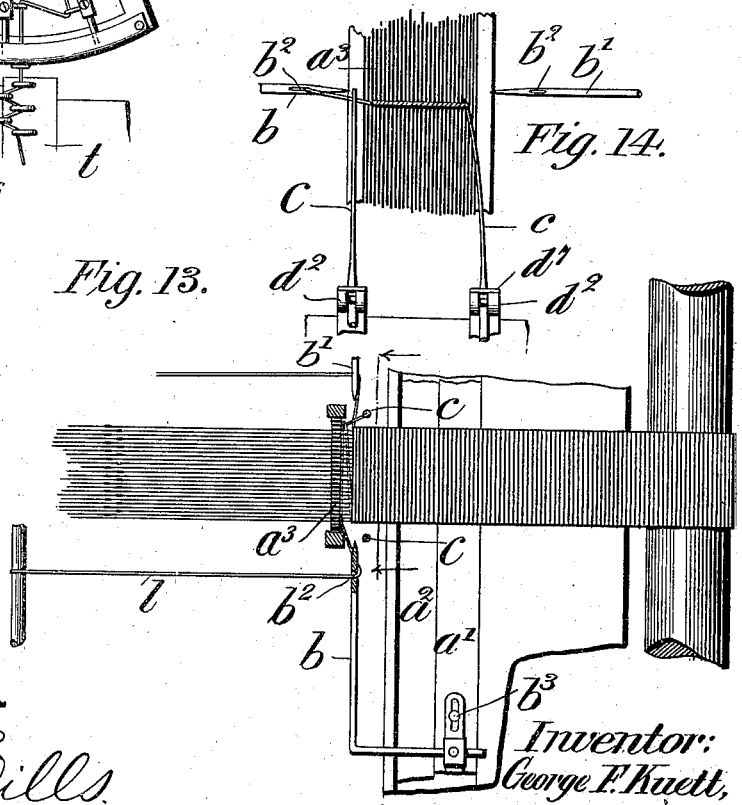
Witnesses:
Inventor:
George F. Kuett, No. 653,249. Patented July 10, 1900.
G. F. KUETT.
LOOM.
(Application filed Dec. 13, 1899.)
(No Model.) 8 Sheets—Sheet 8.
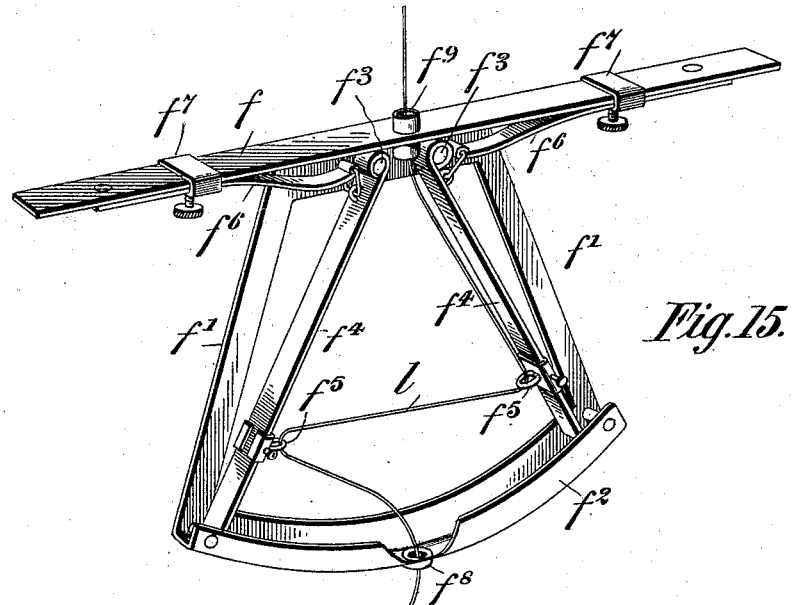
Fig. 15.
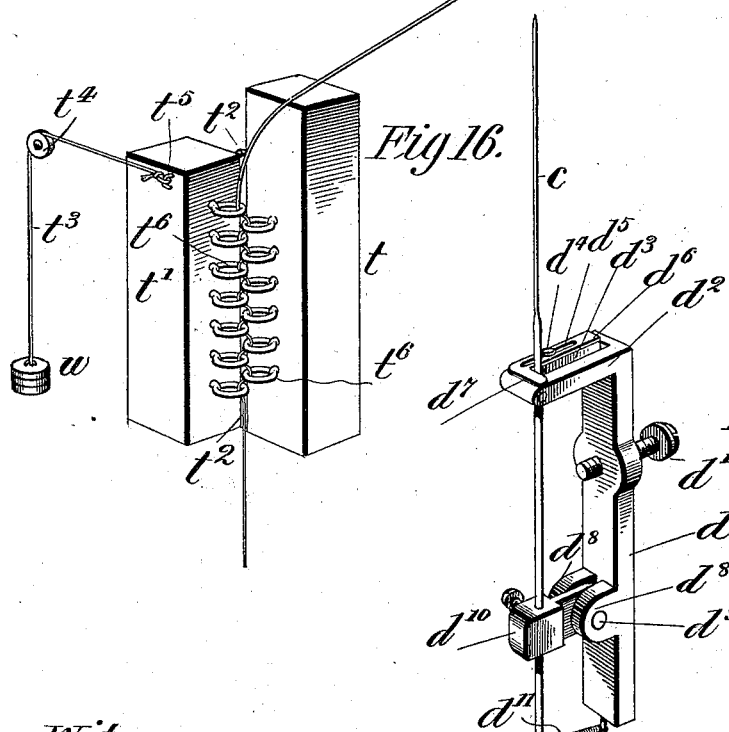
Fig. 16.
Fig. 17.
Witnesses:
L. C. Hills.
Wm. F. Doyle.
Inventor:
George F. Kuett,
By Marcellus Bailey
Atty.
THE NORRIS PETERS CO., PHOTO-LITHO., WASHINGTON, D. C.

UNITED STATES PATENT OFFICE.

GEORGE FRANCIS KUETT, OF PATERSON, NEW JERSEY, ASSIGNOR TO THE AMERICAN AUTOMATIC LOOM COMPANY, OF NEW JERSEY.

LOOM.

SPECIFICATION forming part of Letters Patent No. 653,249, dated July 10, 1900.

Application filed December 13, 1899. Serial No. 740,172. (No model.)

*To all whom it may concern:*

Be it known that I, GEORGE FRANCIS KUETT, a citizen of the United States, and a resident of Paterson, in the county of Passaic and State of New Jersey, have invented certain new and useful Improvements in Looms, of which the following is a specification.

My invention relates to narrow-ware looms, and more particularly to that type wherein the filling is inserted by means of filling-inserting needles which are reciprocated through the sheds to lay the filling in the form of loops. In order that the filling-inserting needles may leave such loops in their respective sheds as they are withdrawn, it has been proposed to provide a filling-loop-engaging needle at the side of each set of warps opposite that into which the inserting-needles first enter and that the loop-engaging needles shall engage and hold the loops and yet free them to the action of the reed at the time of beat-up. Such loop-engaging needles have been given a reciprocation in a direction substantially at right angles to the plane of the warps. This movement of the needles is liable to cause injury to the warp-threads during reciprocation by forcing the needles into the warp, for which reason it has been necessary to so position the needles that their paths of movement would be some distance from the edge of the warps. When so positioned, the loop-engaging needles have produced a defective selvage on the fabric owing to the fact that loops of filling have been formed projecting from the edge thereof, or if the needles have been withdrawn from the loop prior to the beat-up and an attempt made to draw the loops into the line of the selvage-warps an uneven position of the loops has resulted, which has been as objectionable in the finished fabric as the projecting loops. Although the advantages of this style of loom for weaving narrow fabrics, such as ribbons and the like, have been recognized, yet the defective selvage produced thereby has precluded its general adoption.

It is the object of my invention to overcome these objections in this type of loom and to provide a construction that will produce a uniform and even selvage; and to this end my invention consists of the parts and combinations, as will be hereinafter more fully described, and definitely pointed out in the claims.

Figure 7:
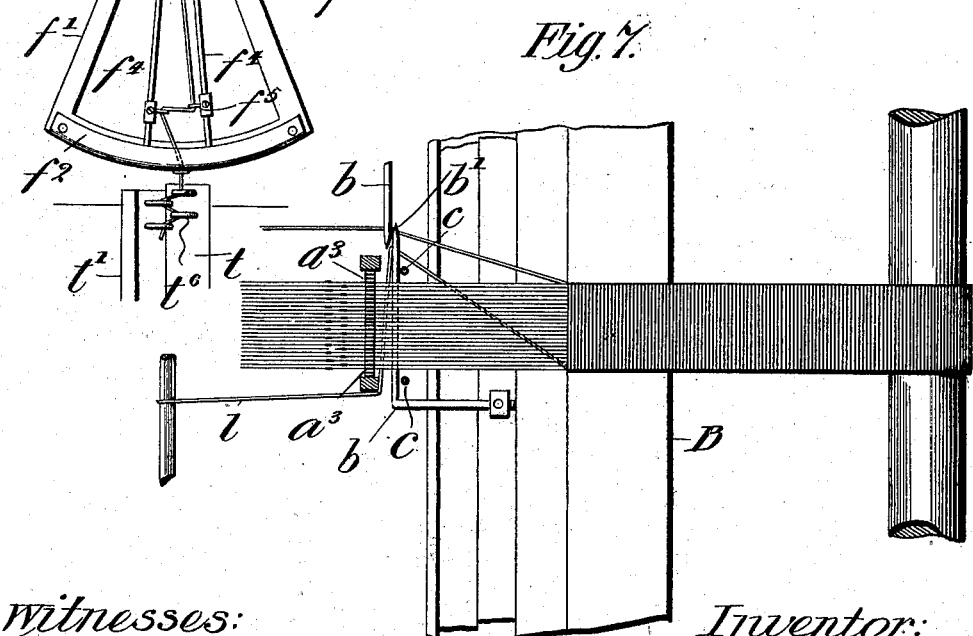

In the drawings, Figure 1 is a sectional side elevation of so much of a loom embodying my invention as needed for the purpose of explanation. Fig. 2 is a plan view of one end of the same. Fig. 3 is a side view looking in the direction of the arrow of the parts shown in Fig. 2. Fig. 4 is a sectional detail showing the position of parts as the lay is moving backward from the point of beat-up and the filling-inserting needle is about to enter the shed. Fig. 5 is a plan view of the parts shown in Fig. 4 with the tension and take-up omitted. Figs. 6 and 7 are views similar to Figs. 4 and 5, respectively, with the lay in its extreme backward position and about to move forward for the beat-up, the filling-inserting needle passed fully through the shed, and the filling-loop-engaging needle rising to engage the filling-loop. Figs. 8 and 9 are views similar to Figs. 6 and 7, respectively, with the lay moving forward, the filling-inserting needle retreating from the shed, and the filling-loop-engaging needle holding the filling-loop. Figs. 10 and 11 are views similar to Figs. 8 and 9, respectively, with the lay approaching the fell of the fabric and the tension on the filling pulling the loop-engaging needle to the edge of the warp. Figs. 12 and 13 are views similar to Figs. 10 and 11, respectively, with the lay just in the act of beating up and the filling-loop-engaging needle drawn against the reed and the edge of the warp. Fig. 14 is a diagrammatic view, in front elevation, in the direction of the arrow, Fig. 13, showing the filling-loop-engaging needle yielding to the edge of the fabric under the tension of the filling. Fig. 15 is a view in perspective of one form of take-up for the filling. Fig. 16 is a like view of a tension device for the filling, and Fig. 17 is a perspective view of one form of filling-loop-engaging needle and its support.

The loom-frame A, the lay B, oscillating from the frame at C, the crank-shaft D, crank E, the connecting-rod F, and the breast-beam G are or may be of any usual or desired construction.

Mounted upon the lay B in any usual manner is the reed $a^3$, which may be formed in sections corresponding to the number of fabrics desired to be woven at any one time, and mounted to slide upon the lay are two filling-needle carriers $a'$ $a^2$. The number of such carriers may obviously be varied; but in this embodiment of my invention I have shown two for the purpose of inserting loops from opposite sides of the warps. These carriers receive reciprocating motion from the cams J K on shaft L through the arms or levers M M', pivoted at $M^2$ $M^3$ and connected by the links N N' to the said carriers, the shaft L and connected cams being driven from the crank-shaft through gearing H and I. In the present instance it will be noticed that the cams J K are so timed by adjustment on the shaft L that they reciprocate the carriers $a'$ $a^2$ alternately to insert filling first from one side and then from the other side of the warp, as will more fully appear. It is obvious, of course, that by adjustment of the cams the carriers may be made to reciprocate simultaneously, or one carrier might be thrown out of operation altogether.

Mounted upon the lay B, preferably in the rear thereof, are brackets $c^2$ $c^2$, provided with guiding-perforations $c^4$ for the rods or bars $c^3$ $c^3$, and connected to the rods or bars $c^3$ $c^3$ is a frame $c'$, extending, preferably, the width of the loom. The bars $c^3$ extend below the lower bracket $c^2$ and are connected to a moving part of the loom in order to impart to the frame $c'$ a rising-and-falling movement. In the present instance the bars $c^3$ are jointed at $c^5$ to a connecting-rod $c^6$, which has an adjustable connection with a lever $c^8$, to which an oscillating motion is imparted by the eccentric $c^{10}$ on crank-shaft D through the eccentric-rod $c^9$. It will be evident from this construction that as the crank-shaft revolves the lay is reciprocated in the direction indicated by the arrow, Fig. 1, and that the frame $c'$ is caused to rise and fall with respect to the lay.

The frame $c'$ carries a series of brackets $d$, secured thereto in any desired manner, as by the screws $d'$, the upper end $d^2$ of the brackets being turned at an angle and slotted at $d^3$, Fig. 17. At one side of the slot $d^3$ there is adjustably secured by a pin $d^4$ and slot $d^5$ an adjusting-arm $d^6$, having an end $d^7$ turned to cross the slot, whereby the length of the slot may be adjusted as desired. Near its lower end the bracket $d$ is provided with lugs $d^8$, to which is pivoted a block $d^{10}$ by means of the pin $d^9$. This block $d^{10}$ is perforated to receive the shank of a filling-loop-engaging needle $c$, which also passes through the slot $d^3$, in which it may move, the block $d^{10}$ by its weight serving to hold the needle against the outer end of the slot. To assist the block in holding the needle in this position, I may provide a spring $d''$, though this is not always necessary.

The needles $c$ are made, preferably, of yielding material and are secured upon the frame $c'$ so that their paths of movement under reciprocation of the frame will clear the edges of the warp and avoid injury thereto, as will clearly appear from Figs. 5, 7, 9, and 13.

Secured, respectively, to the needle-carriers $a'$ $a^2$, preferably by adjustable connections $b^3$, are the filling-inserting needles $b$ $b'$, arranged in pairs and adapted to insert filling from opposite sides of the sets of warp. It is to be understood that one needle of each pair might be omitted, if desired, and the filling introduced from one side only of the warp. Each filling-inserting needle is preferably provided with an eye $b^2$, through which the filling leads on its way from the source of supply to the fabric. Such supply consists of a large mass of yarn, preferably in the form of a conical cop or bobbin, from the end of which the yarn or filling is drawn as needed.

In operation the filling-inserting needles carry loops of the filling through the shed, and the filling-loop-engaging needles rise to engage and hold the loops of filling to prevent their withdrawal as the inserting-needles recede. It is necessary, however, in forming a perfect selvage that the loop-engaging needles shall not only hold the loop until the moment of beat-up, but they must carry said loops close to the edge of the warp, and this I have provided for by making the filling-loop-engaging needles yieldable toward the edge of the warp under the stress of the tension and take-up devices, which will now be described.

Mounted in suitable relation with the source of supply, as the spool or bobbin $s$, Fig. 4, is a tension device, preferably one for each filling-yarn, which continually exerts a retarding influence to the movement of the yarn or filling from the spool or bobbin. This tension device may be of any desired construction; but I have shown it as consisting of two blocks $t$ $t'$, hinged together at $t^2$ $t^2$ and each provided with a series of eyes or guides $t^6$, staggered with relation to each other, as will clearly appear. One of these blocks may be fixed and the other be acted on by a series of weights $w$, attached to a cord $t^3$, which, passing over a suitable guide-pulley $t^4$ and attached to the movable block at $t^5$, tends to normally separate the eyes or guides $t^6$, and thus exert a restraining influence on the passage of the yarn or filling through the eyes or guides.

In proximity to the tension device is the take-up, the purpose of which is to recover the slack of yarn as the filling-inserting needle retreats from the shed and, in connection with the tension device, to pull the loop-engaging needles close up to or against the warp-threads at or just prior to the beat-up, so that when the loop-engaging needle frees the filling-loop the latter will be held in position by the reshedding of the warp, and thus insure a perfect and uniform selvage. The take-up device consists of a frame $f$, $f'$, and $f^2$, to the flat bar $f$ of which are pivoted at $f^3$ $f^3$ the take-up arms $f^4$ $f^4$, guided at their free ends by the curved portion $f^2$ of the frame and having thread-eyes $f^5$ adjustable lengthwise thereon. Near their pivoted ends the arms $f^4$ are connected to the springs $f^6$, which are secured to the flat bar $f$ by means of the adjusting-clamps $f^7 f^7$, as will clearly appear from Fig. 15. Suitable yarn-guiding eyes $f^8 f^9$, preferably formed of some vitreous material, are provided in the curved portion $f^2$ and flat bar $f$ for the passage of the yarn. It will be noticed that the take-up capacity of the arms $f$ may be varied either by adjusting the yarn-guide eyes $f^5$ on the arms $f^4$ or by sliding the clamps $f^7$ nearer to or farther from the pivots of the arms to thereby vary the tension of the springs $f^6$. While I have shown and described this as my preferred form of take-up, it is to be understood that my invention is not limited thereto, as any form of take-up that will act to recover the slack yarn or filling and coöperate with the tension device to pull the filling-loop-engaging needles against the warp is within the scope of my invention.

Having thus described the structural embodiment of my invention, though without intending thereby to limit myself to the particular means set forth, the operation thereof will now be described in connection with one filling-inserting needle and one filling-loop-engaging needle through a complete cycle of their movements, it being understood that the other needles with which the loom may be equipped act in the same manner. Particular reference may be had to Figs. 4 to 14, inclusive. The parts being in the position indicated by Figs. 4 and 5, with the lay on its backward movement from the fell of the fabric and the shed being formed, the filling-loop-engaging needle $c$ is in its lowest position and the filling-inserting needle $b$ on the opposite side of the warp is about to move into the shed. At this time the take-up arms $f^4 f^4$ are well separated and there is no slack in the filling. As the lay reaches its rearmost position the filling-inserting needle has passed through the shed, drawing the take-up arms $f^4 f^4$ together and a supply of filling from the spool or bobbin S through the tension device, and the parts assume positions indicated in Figs. 6 and 7, with the filling-loop-engaging needle $c$ raised into the angle formed in the filling near the end of the inserting-needle $b$. (See Fig. 6.) The lay now starts to beat up and the filling-inserting needle $b$ commences its retreating movement, leaving the loop of filling engaged by the needle $c$ and producing some slack in the filling $l$, which is taken up by the arms $f^4 f^4$, (see Fig. 8,) while the tension device acts as a clamp to prevent further supply of filling. In the continued forward movement of the lay the filling-inserting needle $b$ is entirely withdrawn from the shed, and increased tension is thus exerted on the filling sufficient to draw the filling-engaging needle $c$ against the warp-threads, where, with the increased resistance thus offered the needle against further yielding, it remains as the lay approaches the fell. (See Figs. 10 and 11.) The particular function of the tension and take-up devices is exerted at this time, the former acting to prevent further supply of filling and the latter to exert sufficient pull or take-up on the filling to draw and hold the needle $c$ firmly against the warp—a position it maintains until the movement of beat-up and the shed has been changed.

It will be noticed that the filling-loop-engaging needle $c$ is not only located well outside the edge of the warp to obviate liability of injury thereto during its rising-and-falling movement, but it is also carried some distance in front of the reed $a^3$ in order that the filling-inserting needle $b$ may pass between it and the reed and properly deliver the loop. Since the loop-engaging needle $c$ holds the loop of filling until the moment of beat-up, provision must be made for permitting the said needle to yield toward the reed, and this has been provided in one form of my invention by mounting the said needle in the bracket $d$ by a yielding or flexing connection, as above described. It is desirable under some conditions of yarn or filling that the loop-engaging needle shall be adjusted or regulated in its movement toward and from the reed in order to properly position the filling-loop at the fell of the fabric, and this has been accomplished by the adjustable plate $d^6$, above set forth in detail.

The provisions for permitting the loop-engaging needles to move or yield toward the reed come into operation particularly as the lay reaches the fell, as shown in Figs. 12, 13, and 14. This occurs as the shed is changed, which firmly binds the filling to place and prevents the take-up devices from drawing the filling-loop within the warp. The frame $c'$ is then lowered and the filling-loop-engaging needle is withdrawn from the loop and the parts assume position as indicated in Figs. 4 and 5.

From the foregoing it will be observed that while the filling-loop-engaging needles are all mounted on the same frame and rise and fall collectively and together in the operation of the loom, yet they are separately and individually movable not only toward and from the reed, but also toward and from the warps. Such individual movement may be secured in a variety of ways, as will be evident to one skilled in the art; but I have preferably formed the needles of light flexible material to permit movement or flexure toward the warp under tension of the filling and provide for their movement toward and from the reed by a flexible mounting for each needle in addition to its elastic or yielding character.

Manifestly the structural details of the loom can be considerably varied without departure from the spirit of the invention. The essential characteristic of my invention is that the filling-loop-engaging needles in addition to the usual reciprocatory movement by which they enter and quit the loops have or are capable of two other and distinct motions—the one toward and away from the reed and the other toward and away from the edge of the warps—and that with the needles thus constructed and arranged are combined means by which they shall be drawn up to and held at the edge of the warps at the time the reed approaches the fell of the cloth and the loops are about to be beaten up. In their rising movement it is necessary, as hereinbefore pointed out, that the needles shall clear the edge of the warps to prevent injury thereto, and the preferred way of effecting this result is to mount the needles well outside of the edge of the warps, as herein illustrated. What is essential, however, in this respect is that the point of the needle when it reaches the plane of the warp shall be well to one side of the edge of the warps, and this result obviously can be obtained in a variety of ways—as, for example, by bending or curving the upper portion of the needle outward or by setting the needle diagonal or slanting with its point directed outside the edge of the warps; but in every instance that part of the needle which at the time it is at the plane of the warp stands normally at a distance from the edge of the warps must be yieldable toward the edge of the warps to permit the needle to be withdrawn from the loop without pulling out the latter.

Having described my invention and the best way now known to me for carrying the same into effect, what I claim as new, and desire to secure by Letters Patent, is as follows:

1. In a loom, the combination, substantially as hereinbefore set forth, of the following elements: a lay, a reed mounted thereon, a filling-inserting needle movable lengthwise of the lay, a filling-loop-engaging needle, means for reciprocating it in a path transverse to that of the filling-inserting needle, and provisions for moving said loop-engaging needle toward the reed and the edge of the warp.

2. In a loom, the combination, substantially as hereinbefore set forth, of the following elements: a lay, a reed mounted thereon, a filling-inserting needle, a tension device, a take-up interposed between the tension device and filling-inserting needle, and a filling-loop-engaging needle adapted to yield toward the reed and the edge of the warp.

3. In a loom, the combination, substantially as hereinbefore set forth, of the following elements: a lay, a reed mounted thereon, filling-inserting needles for inserting filling into the warp from opposite sides thereof, tension devices for the filling, take-ups interposed between the tension devices and filling-inserting needles, and filling-loop-engaging needles yieldable toward the reed and the edge of the warp.

4. In a loom, the combination, substantially as hereinbefore set forth, of the following elements: a lay, a reed mounted thereon, a series of filling-inserting needles, tension devices for the filling, take-ups interposed between the tension devices and filling-inserting needles, and a series of filling-loop-engaging needles collectively movable to engage and quit the filling and individually movable toward and from the reed and the edge of the warp.

In testimony whereof I have hereunto set my hand this 12th day of December, 1899.

GEORGE FRANCIS KUETT.

Witnesses:
CHAS. L. MANDEVILLE,
WILLIAM E. FISCHER.